United States Patent
Lazar

[19]

[11] Patent Number: 6,166,686
[45] Date of Patent: Dec. 26, 2000

[54] CORRECTED MAGNETIC COMPASS

[75] Inventor: Jonathan Noel Lazar, Huntington Beach, Calif.

[73] Assignee: Northrop Grumman Corporation, Los Angeles, Calif.

[21] Appl. No.: 09/183,398

[22] Filed: Oct. 30, 1998

[51] Int. Cl.[7] .................................................. H04B 7/185
[52] U.S. Cl. .............................. 342/357.14; 342/357.06; 342/417; 701/213
[58] Field of Search ...................... 342/357.14, 357.06, 342/417, 415; 701/213, 216; 33/356, 357, 326

[56] References Cited

U.S. PATENT DOCUMENTS

| | | | |
|---|---|---|---|
| 4,031,630 | 6/1977 | Fowler | 33/356 |
| 4,091,543 | 5/1978 | Lapeyre | 33/356 |
| 4,743,913 | 5/1988 | Takai | 342/457 |
| 4,831,563 | 5/1989 | Ando et al. | 364/571.05 |
| 5,146,231 | 9/1992 | Ghaem et al. | 342/415 |
| 5,266,958 | 11/1993 | Durboraw | 342/357 |
| 5,283,743 | 2/1994 | Odagawa | 364/457 |
| 5,339,246 | 8/1994 | Kao | 364/457 |
| 5,349,530 | 9/1994 | Odagawa | 364/449 |
| 5,396,709 | 3/1995 | Swan | 33/268 |
| 5,440,484 | 8/1995 | Kao | 364/424.01 |
| 5,485,385 | 1/1996 | Mitsugi | 364/449 |
| 5,617,317 | 4/1997 | Ignagni | 364/449.9 |
| 5,699,245 | 12/1997 | Herold | 364/420 |

*Primary Examiner*—Thomas H. Tarcza
*Assistant Examiner*—Dao L. Pham
*Attorney, Agent, or Firm*—Terry J. Anderson; Karl J. Hoch, Jr.

[57] ABSTRACT

A directional finding system for providing a corrected compass bearing based upon true north rather than magnetic north for a selected location. The true bearing is calculated by determining a present position with a GPS receiver or other location finding device, then selecting the deviation between true north and magnetic north for the present position from a store of magnetic deviation data, and finally correcting the magnetic bearing by the deviation to find a true bearing. The store of magnetic deviation data comprises the deviation between true north and magnetic north for any location. Additionally, the true bearing can be further corrected by a time-based magnetic deviation based upon the monotonic movement of the magnetic north pole. The true bearing is presented on a display along with the magnetic bearing and the present position.

11 Claims, 1 Drawing Sheet

CORRECTED MAGNETIC COMPASS

FIELD OF THE INVENTION

The present invention relates generally to direction finding devices and more particularly to a system that can correct magnetic bearings to true bearings.

BACKGROUND OF THE INVENTION

The Earth's magnetic field can assist in finding a direction or bearing to any object or location by using a magnetic compass. In a traditional magnetic compass, a magnetic needle or card detects the magnetic field lines of the Earth and always points in a direction toward magnetic north such that a compass bearing or direction can then be calculated. Additionally, the resultant compass readings can be presented on a digital display which show the bearing to an object or the heading of a boat, aircraft or vehicle. Therefore, by knowing the direction of magnetic north, it is possible to compute the bearing or direction toward any given object or location.

However, magnetic north is not the same as true north since the magnetic north pole is not positioned concentrically with the North Pole of the Earth. Therefore, the compass needle will point in a direction along a curve leading to the magnetic north of the Earth and not toward the North Pole. Additionally, the Earth's magnetic field slowly moves monotonically over time thereby causing a time-based deviation between magnetic north and true north as well.

Surveys of the magnetic field lines of the Earth have been made which show the deviation between magnetic north and true north in degrees. It has been found that in some locations of the United States, there can be as much as 23 degrees of deviation between what a compass reads as magnetic north and the direction to true north. Therefore, as an aid in calculating a bearing based upon true north, maps and tables have been created which catalog and chart the deviation between magnetic north and true north for any location, as well as show the deviation based upon time. As such, in a given location, it is possible to find true north by correcting a magnetic compass reading by the amount of deviation for that present location at the present time and then correspondingly correcting all magnetic bearings to true bearings.

Bearings based upon true north are invaluable for navigators and mappers. As previously described, the deviation between magnetic north and true north varies by location. Therefore, in a fast moving aircraft, a magnetic compass cannot give accurate directional information to a navigator or pilot because the magnetic compass readings change as the aircraft changes location. As such, presently aircraft use gyro-compasses that are able to display true north readings. However, gyro-compasses are expensive and bulky and are not suitable for all applications.

Additionally, bearings based upon true north are easier to use on maps and charts. Since most charts are oriented by latitude and longitude lines that are based upon true north, it is easier to find locations on a chart knowing a true bearing. Additionally, map makers need to use true bearings when making a large map over a wide-ranging area because the magnetic bearings can vary significantly between location. Therefore, there is a need for an affordable and compact compass that reads true bearings.

The present invention addresses the deficiencies in the prior art magnetic compasses by providing a system that presents true bearings in a compact and inexpensive unit. Additionally, the present invention can compensate for time-based deviations of the Earth's magnetic field. Finally, the present invention can provide a system that displays a true bearing, a magnetic bearing and a present location in a single unit.

SUMMARY OF THE INVENTION

In accordance with the preferred embodiment of the present invention, there is provided a directional finding system for providing a corrected compass reading based on true north for a selected location. The system comprises a location device for generating a location signal corresponding to the selected location and based upon a known coordinate system. Furthermore, in electrical communication with the location device is a storage device which electronically stores deviation data correlating magnetic north to true north for any location. As such, the storage device is operative to generate a deviation signal corresponding to the deviation between magnetic north and true north based on the location signal. In the preferred embodiment of the present invention, a magnetic compass device is in electrical communication with the storage device to thereby generate a magnetic bearing reading and a true bearing reading. The true bearing reading is based upon a correction of the magnetic bearing reading with the deviation signal.

In the preferred embodiment of the present invention, a clock in electrical communication with the storage device may be provided for generating a time signal based on the current time and date. As such, the deviation data electronically stored within the storage device further correlates magnetic north to true north for the current time and date. Therefore, the deviation signal generated thereby corresponds to the deviation between magnetic north and true north based on the location signal and the time signal. In the present invention, a display may be provided that can present the magnetic bearing reading, the true bearing reading and the present location. It is contemplated that the display can either be a digital display or a needle. Additionally, in the preferred embodiment of the present invention, the location device may be a Global Positioning System (GPS) receiver and the deviation data may be stored as digital information.

Further in accordance with the present invention, there is provided a method for determining a true bearing comprising the step of generating a location signal corresponding to the selected location. Next, a deviation signal is generated corresponding to the deviation between true north and magnetic north based on the location signal. A magnetic bearing reading is generated and finally, a true bearing reading is generated based upon a correction of the magnetic bearing reading with the deviation signal.

Additionally, the method for determining the true bearing may comprise the additional steps of generating a time signal based upon the current time and date. Then the deviation signal is generated based upon the location signal and the time signal such that the deviation signal corresponds to a time-based deviation as well as a location-based deviation.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
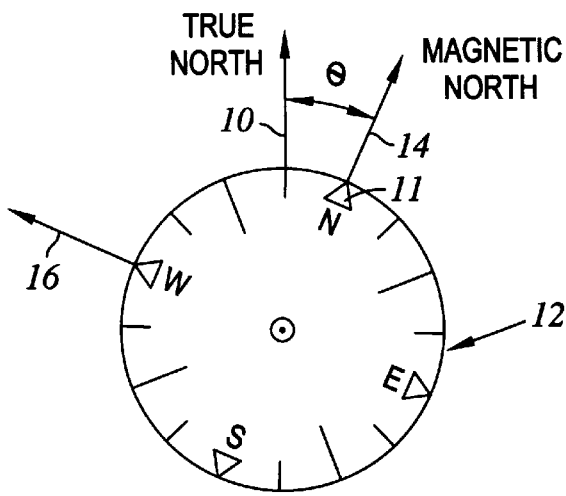
FIG. 1 is a schematic depiction of the deviation between magnetic north and true north.

Referring now to the drawings wherein the showings are for purposes of illustrating a preferred embodiment of the present invention only, and not for purposes of limiting the same, FIG. 1 is an illustration of the error induced from the deviation between magnetic north and true north. As can be seen in FIG. 1, the direction toward true north is indicated by arrow 10. However, the north arrow 11 on magnetic compass 12 does not point in the direction of true north as designated by arrow 10 but in a direction along a curve leading to magnetic north as designated by arrow 14. This is caused from the magnetic north pole not being identically located with the North Pole of the Earth. Therefore, any magnetic compass 12 will deviate from true north by a deviation θ as seen in FIG. 1. As is well known and charted, the deviation θ can vary greatly between locations.

Determining a magnetic bearing or compass direction to an object or location is accomplished by using magnetic compass 12. As by way of example only and not by way of limitation, in FIG. 1, a direction or magnetic bearing toward an object or location is indicated by arrow 16 which is pointing in a direction toward magnetic west as displayed on magnetic compass 12. However, as previously discussed, magnetic bearing 16 is not a true bearing because of the magnetic deviation θ present between true north 10 and magnetic north 14. Therefore, in order to compute a true bearing, the magnetic bearing 16 must be corrected by the deviation θ for that specific location. For example, if the magnetic bearing 16 is 270° and the magnetic deviation θ between true north 10 and magnetic north 14 is +13° for that given location, then the magnetic bearing 16 must be corrected by +13° in order to find a true bearing. Therefore, in the present example, the true bearing would be 270°+13°= 283°. In this example, the deviation of magnetic north 14 is to the east of true north 10 so that the deviation θ is a positive value. However, the deviation θ will be a negative value if magnetic north 14 is to the west of true north 10.

Figure 2:
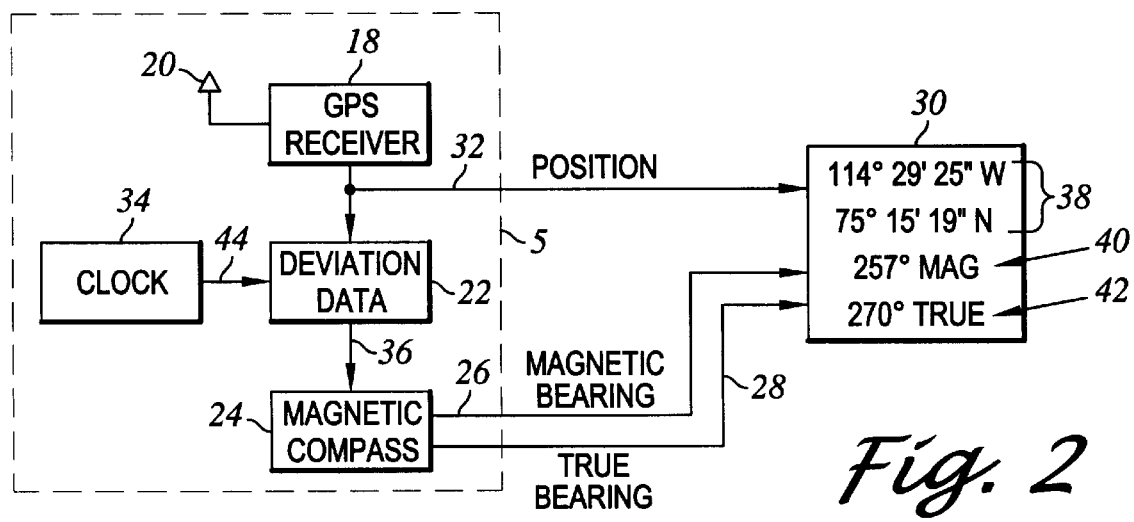
FIG. 2 is a block level diagram of the preferred embodiment of the present invention.

In the preferred embodiment of the present invention, as shown in FIG. 2, there is provided a directional finding system 5 for determining a true bearing or direction. The system 5 comprises a GPS receiver or other type of electronic location device 18 for determining a present location. Ideally, location device 18 will generate an electronic location signal 32 corresponding to the present position of the system 5 based on a known coordinate system. It is preferable that location device 18 be a GPS receiver that accurately determines a present position by receiving satellite signals through antenna 20. However, in the system 5, it is not necessary that location device 18 be a global positioning system receiver but it is contemplated that it could be any type of device for accurately determining the present position of the system 5.

In the present invention, system 5 additionally comprises an electronic storage device 22 in electrical communication with location device 18. The storage device 22 electronically stores a catalog of the deviation θ between magnetic north 14 and true north 10 for any given location in order to form a store of deviation data. As such, the store of deviation data can be in the form of digital data on a CD ROM, magnetic disc, computer memory or any other type of recordable digital storage device. Alternatively, the data may also be recorded analog information. The store of deviation data may be compiled from the Coast and Geodetic Survey which has made over 7,000 observations of the deviation θ for the United States and its territories as well as from other similar surveys made in the United States and other countries around the world.

In the preferred mode of operation, GPS receiver 18 provides the storage device 22 with location signal 32 corresponding to the present location of system 5. From location signal 32, the storage device 22 can select, with electronic circuitry, the deviation θ between magnetic north 14 and true north 10 from the store of deviation data. Additionally, the storage device 22 includes circuitry that will generate an electronic deviation signal 36 corresponding to the deviation between magnetic north 14 and true north 10 for the present location based on the location signal 32.

As seen in FIG. 2, the system 5 further comprises a magnetic compass device 24 in electrical communication with storage device 22. Magnetic compass device 24 comprises a a flux gate compass or any other type of electronic magnetic compass, as currently known in the art, that determines a magnetic bearing reading based upon magnetic north and generates a magnetic bearing signal 26 corresponding to this reading. For proper operation of the system 5, magnetic compass device 24 contains additional electronic circuitry that can correct the magnetic bearing signal 26 with deviation signal 36 to thereby generate a true bearing reading and a corresponding true bearing signal 28. In this respect, the magnetic bearing signal 26 generated from compass device 24 is corrected with the deviation signal 36 generated by storage device 22 by summing the deviation data θ with magnetic bearing signal 26.

In the preferred embodiment of the present invention, there is provided a display 30 for displaying the present location of the system 5 and the bearing information generated from magnetic compass device 24. As such, display 30 is in electrical communication with location device 18 and magnetic compass device 18 whereby display 30 contains electronic circuitry that can display the present position 38 corresponding to location signal 32 received thereby. The present position 38 can be represented in coordinates based upon latitude and longitude or as will be recognized, any other type of known coordinate system. Similarly, display 30 contains electronic circuitry that can present a magnetic bearing reading 40 corresponding to magnetic bearing signal 26 and also a true bearing reading 42 corresponding to the true bearing signal 28. Preferably, display 30 can be a digital display (as shown) or any other type of display such as a needle corrected by the deviation θ such that the needle points in the direction of true north.

A further refinement of the system 5 shown in FIG. 2 includes a clock 34 in electrical communication with storage device 22 to generate a time signal 44 based on the current time and date. As is known in the art, the magnetic deviation θ can vary over time as well as location such that the store of magnetic deviation data will need to be corrected by an annual monotonic variance. When used with clock 34, the store of deviation data will also comprise data on the monotonic deviation of magnetic north 14 in order to compute a time-based deviation.

As such, clock 34 provides the time signal 44 needed for the deviation θ to be further corrected for deviations based upon the monotonic movement of the Earth's magnetic field. Therefore, storage device 22 will contain electronic circuitry that will generate deviation signal 36 corresponding to the time-based deviation as well as a location-based deviation.

In this respect, deviation signal 36, applied to magnetic compass device 24, will be more accurate because it will be based upon both a time-based deviation and a location-based deviation. Accordingly, magnetic compass device 24 applies deviation signal 36 (which is based on the location and time signals 32, 44) to the magnetic bearing signal 26 as previously described in order to generate the true bearing signal 28.

As described above, the present system 5 provides an accurate and cost efficient package for determining a true bearing based upon true north. It is contemplated that system 5 can be constructed in a portable and compact unit with a display 30 to present the bearing and location information as described above. Therefore, the system 5 could be used for recreational hiking, boating or camping to provide the user accurate bearing information. Additionally, the system 5 could be used for surveying operations or navigational use in a aircraft wherein precision is critical.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A directional finding system for providing a corrected compass reading based on true north for a selected location, comprising:

a location device for generating a location signal corresponding to the selected location based on a known coordinate system;

a storage device including electronically stored deviation data for correlating magnetic north to true north in any location, the storage device being in electrical communication with the location device and operative to generate a deviation signal corresponding to the deviation between magnetic north and true north based on the location signal;

a clock in electrical communication with the storage device and operative to generate a time signal based on a current time and date;

the deviation data electronically stored within the storage device further correlating magnetic north to true north for current time and date with the deviation signal generated thereby corresponding to the deviation between magnetic north and true north based on the location signal and the time signal; and a magnetic compass device in electrical communication with the storage device, the magnetic compass device being operative to generate a magnetic bearing reading, and a true bearing reading based on a correction of the magnetic bearing reading with the deviation signal.

2. The directional finding system of claim 1 wherein the location device is a global positioning system receiver.

3. The directional finding system of claim 1 wherein the deviation data is stored as digital information.

4. The directional finding system in claim 1 further comprising a display for presenting the true bearing reading and the magnetic bearing reading.

5. The directional finding system of claim 4 wherein the display is a needle.

6. The directional finding system of claim 4 wherein the display is a digital display.

7. The directional finding system of claim 4 wherein the location device is further adapted to generate a present location reading which is based upon the location signal and presented on the display.

8. A method of determining a true bearing reading for a selected location, comprising the steps of:

a) generating a location signal corresponding to the selected location;

b) generating a time signal based upon a current time and date;

c) generating a deviation signal corresponding to the deviation between true north and magnetic north based on the location signal;

d) said deviation signal corresponding to the deviation between true north and magnetic north based on the location signal and the time signal;

e) generating a magnetic bearing reading;

f) generating a true bearing reading based upon a correction of the magnetic bearing reading with the deviation signal.

9. The method of claim 8 further comprising the step of:

g) presenting the true bearing reading on a display.

10. The method of claim 9 wherein step (g) further includes presenting the magnetic bearing reading on the display.

11. The method of claim 10 wherein step (g) further includes presenting a present location on the display based upon the location signal.

\* \* \* \* \*